Jan. 2, 1962 R. G. ALLEN 3,015,189
SELECTIVE CONTROL APPARATUS FOR AUTOMATIC
GLASS FORMING MACHINE
Filed Dec. 2, 1957 9 Sheets-Sheet 4
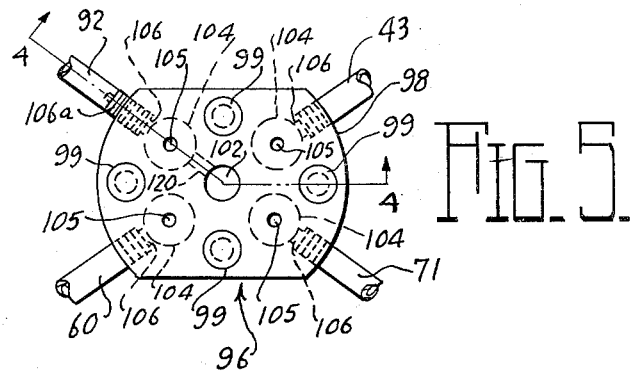
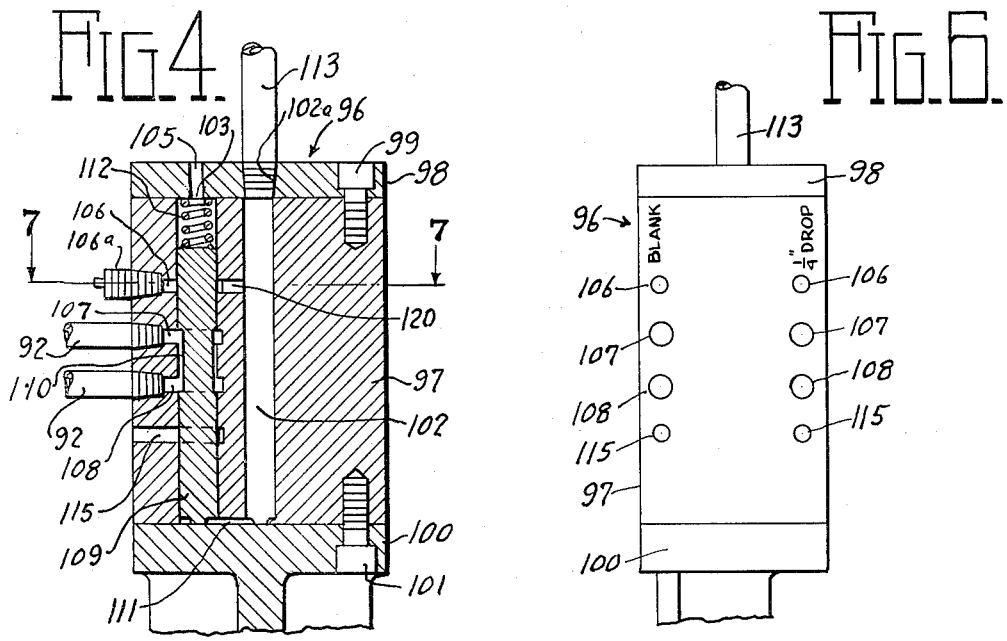
INVENTOR.
Russell G. Allen
BY
J. R. Nelson &
W. A. Schaich
ATTORNEYS

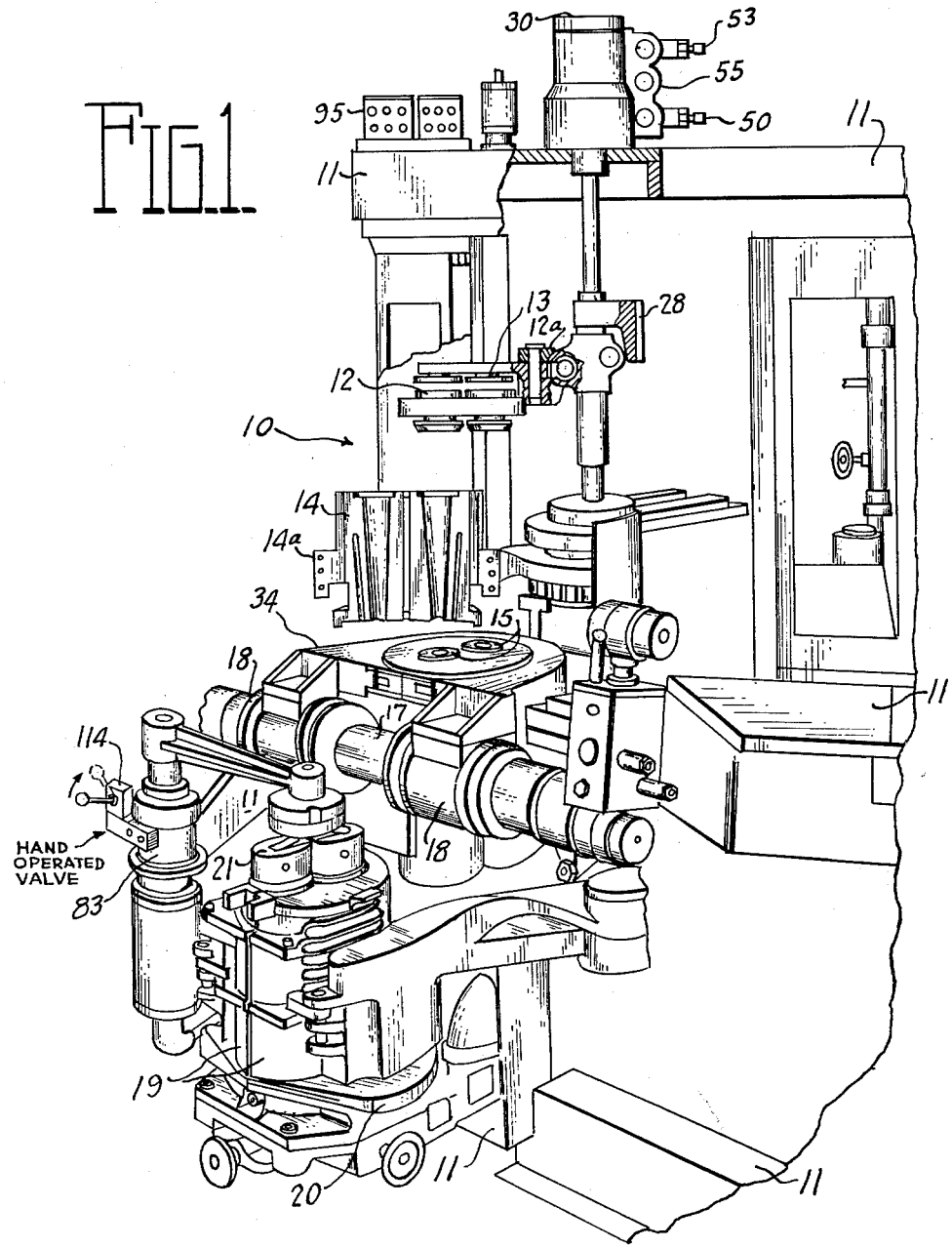

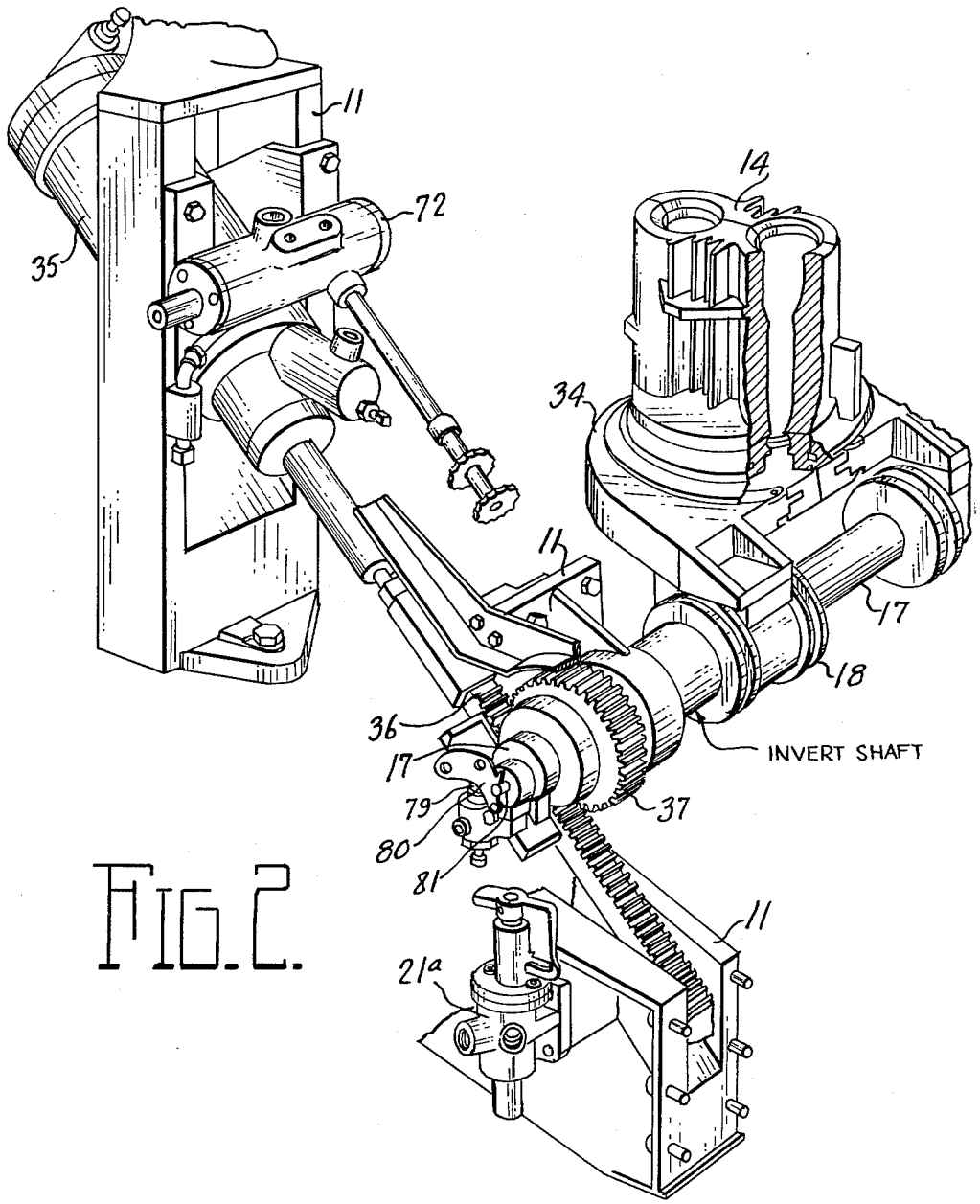

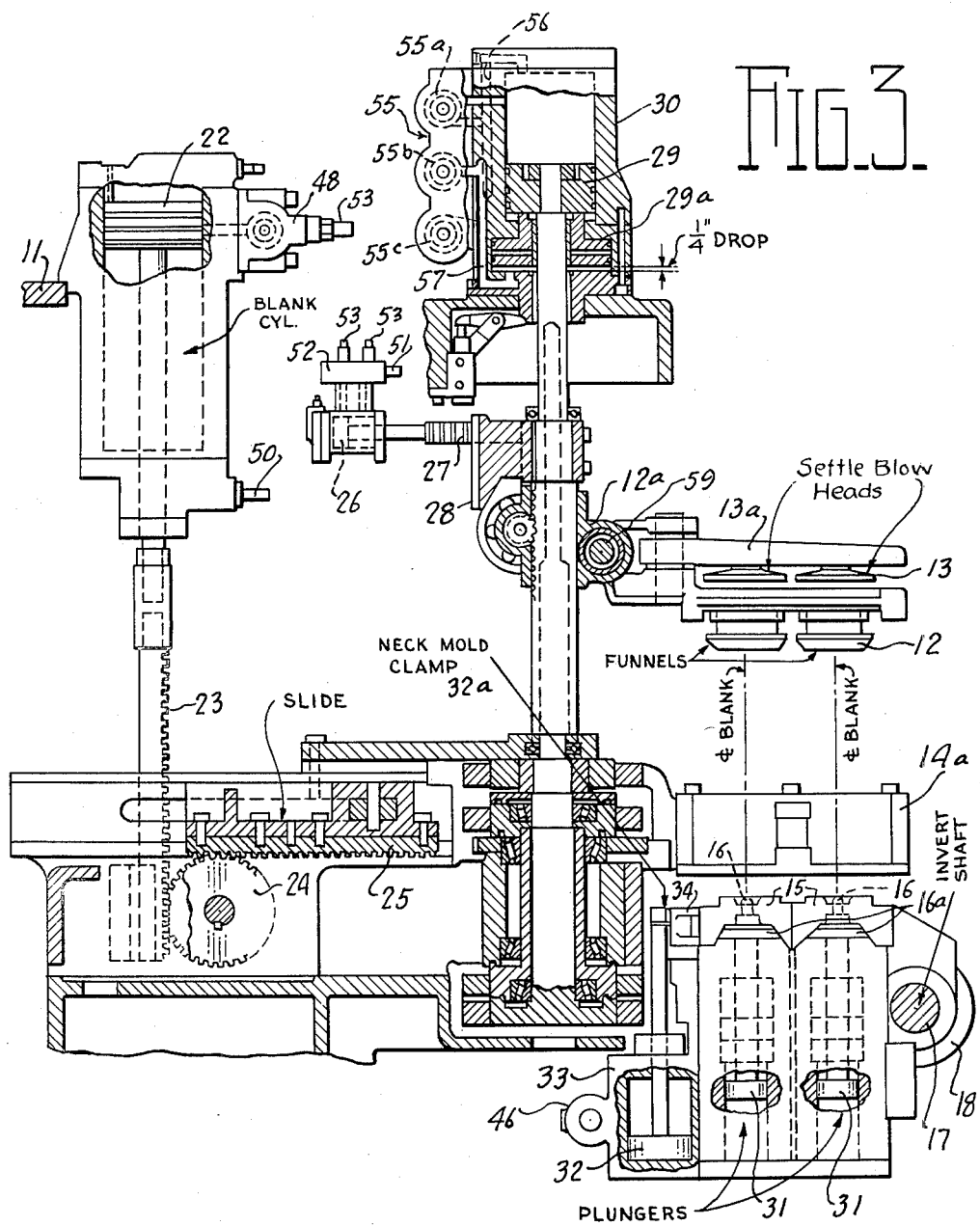

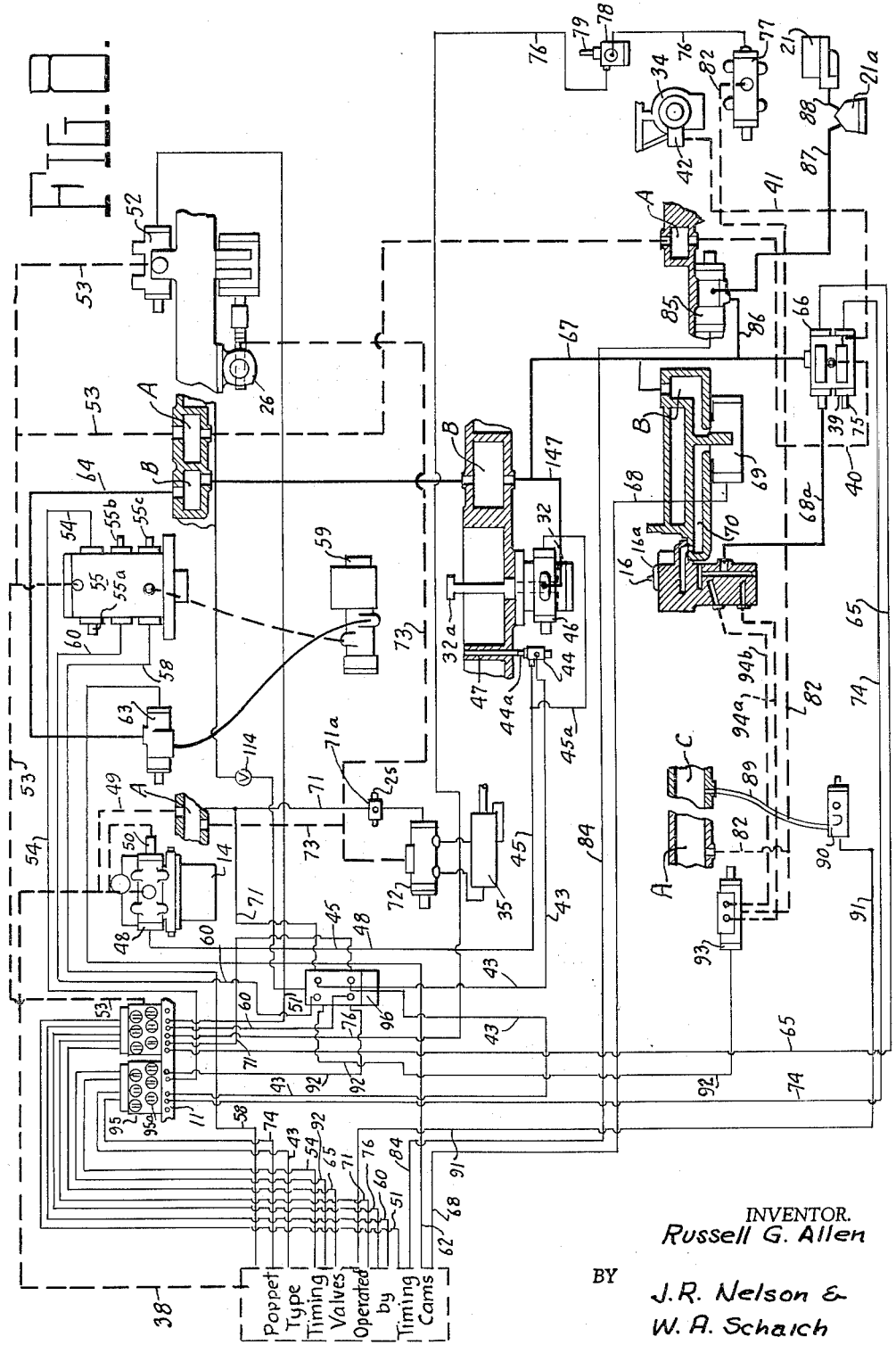

SETTLE ¼" DROP

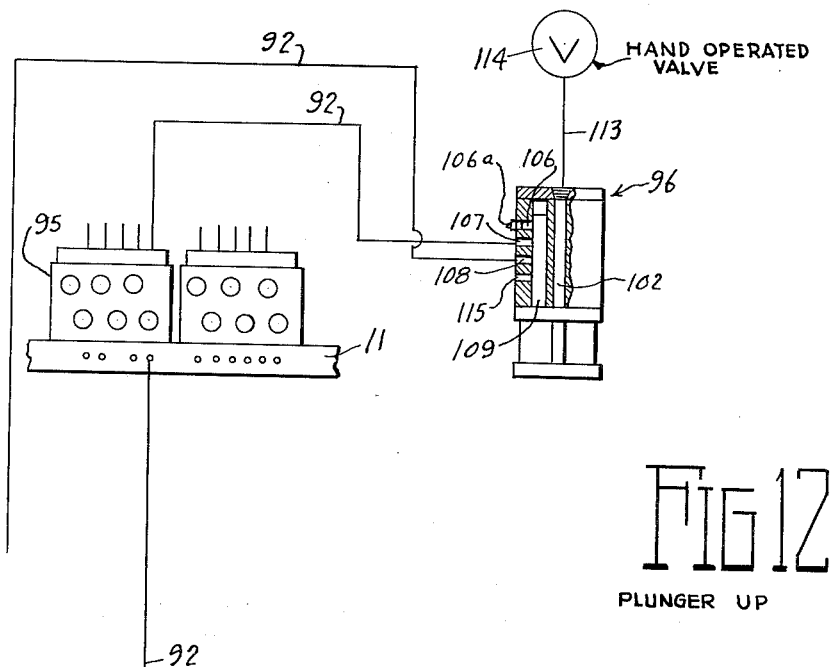
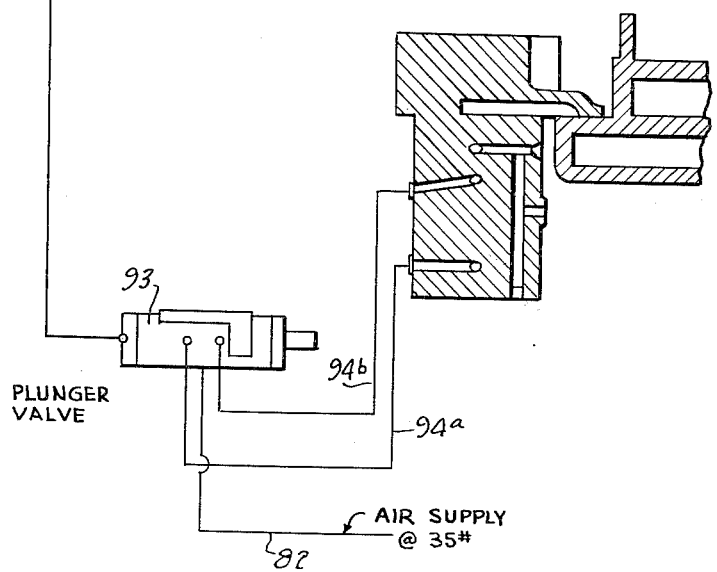
FIG 12.
PLUNGER UP
INVENTOR.
Russell G. Allen
BY
J.R. Nelson &
W. A. Schaich
ATTORNEYS

United States Patent Office 3,015,189
Patented Jan. 2, 1962

3,015,189
SELECTIVE CONTROL APPARATUS FOR AUTOMATIC GLASS FORMING MACHINE
Russell G. Allen, Boynton Beach, Fla., assignor to Owens-Illinois Glass Company, a corporation of Ohio
Filed Dec. 2, 1957. Ser. No. 700,131
7 Claims. (Cl. 49—19)

This invention relates to control apparatus for glass forming machinery adapted to operate automatically through various glass forming operations, and more specifically, it is a control for such machinery to permit the automatic glass forming operations of one section or head of a machine to be interrupted while the machine is running to facilitate adjustments or repairs to it without effecting operation of the other heads of the machine.

As herein described and illustrated, the invention is adapted for use with an automatic rotary glass blowing machine for blow forming bottles, jars, or other articles, but may have a much wider field of use.

One type of such a machine comprises a carriage rotatable continuously about the vertical axis of a stationary drum and a multiplicity of individual heads or units on the carriage. Each head functions as an article forming machine of itself and, during rotation of the carriage, performs the series of operations necessary to produce a blown article. Air motors mounted to rotate with the carriage and form part of the heads effect such operations in succession. Control devices on the stationary drum automatically control such operations of the air motors. The automatic control for the operation of each head of the machine is disclosed in my U.S. Patent 2,860,524, and will be referred to briefly herein in connection with a hydraulic piping diagram of one of the operating heads of the machine.

Inasmuch as each head of the machine is fully automatic and all heads are carried on a rotary base passing a stationary timing drum, it becomes necessary to stop the entire machine to stop operation of a particular head thereof for replacing or adjusting one of the operating parts on that head, such as changing plungers, blank molds, etc. Stopping and starting the machine disrupts the efficiency of the other heads which do not need adjustment at the time and further creates problems in bringing the machine into proper synchronized relationship with other auxiliary machinery dependent on the forming machine. Such minor changes or adjustments could be made to one or more of the heads while the entire machine is operating.

It is, therefore, one of the main objects of this invention to provide a control means having an overriding effect on the automatic control governing forming operations of each head of the machine to permit stopping the operation of any selected head, at will, for making such adjustments or changes of the operating parts as may become necessary and while the remainder of the machine is running.

A further object of the invention is to provide a fully automatic glass blowing machine with a multiplicity of heads adjustable, at will, to render any selected head inoperative so that its glass forming operational parts, such as blank molds, funnels, neck rings, and plungers may be changed on that selected head while the rest of the machine continues to run and produce glass articles, thereby permitting entire operation of the machine so that it does not have to be interrupted for making any such change to these parts as the need arises.

Another object of the invention is to provide a control system for a rotary glass blowing machine fed from a flow-type glass feeder to give the machine the practical operational characteristics and advantages of an individual section stationary machine.

Another object of the invention is to provide control means, as aforesaid, that is practical and adaptable to installation and use on existing glass forming machines.

The specific nature of this invention, as well as other objects and advantages thereof, will become apparent to those skilled in the art from the following description, taken in conjunction with the sheets on which, by way of preferred example only, is illustrated the invention adapted for practical use on a gob fed fully automatic rotary glass blowing machine.

The term "head" or "machine head" is intended to define an individual unit having a multiplicity of units on the machine, each unit itself capable of functioning as an article forming machine through performance of a series of operations on the charges of glass fed to it necessary to produce blown articles therefrom.

On the drawings:

FIG. 1 is a perspective view of one head of a rotatable glass blowing machine to which the invention is applied, the machine having a multiplicity of such heads circumferentially mounted on a continuous rotatable carriage.

FIG. 2 is a perspective view showing the blank mold station and invert mechanism of the machine head shown in FIG. 1.

FIG. 3 is a sectional elevational lview showing the operating mechanism of the machine head of FIG. 1 utilized in forming and delivering a glass parison to a finishing mold.

FIG. 4 is a side sectional elevational view taken along lines 4—4 of FIG. 5.

FIG. 5 is a plan view of the novel control valve of the invention operable for interrupting the automatic cycle of a machine head.

FIG. 6 is a front elevational view of the control valve of FIG. 5.

FIG. 7 is a sectional plan view taken along lines 7—7 of FIG. 4.

FIG. 8 is a schematic piping diagram of the automatic control system of one head of the machine.

FIG. 12 is a partial schematic view showing the control valve of the invention connected into the automatic control system of FIG. 8 for regulating "plunger" mechanism.

Figure 9:
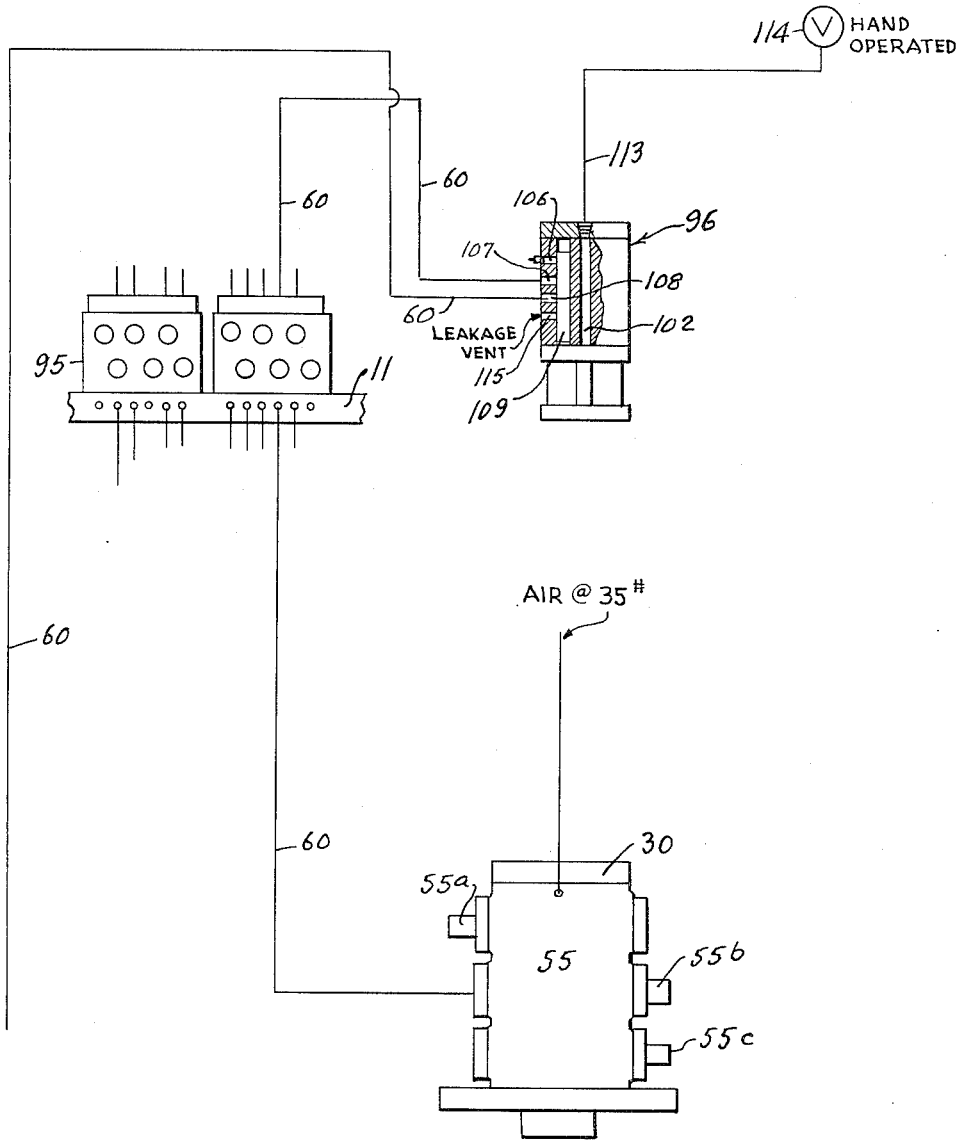
FIG. 9 is a schematic diagram showing the control valve of the invention connected into the automatic control system of FIG. 8 for regulating the "settle ¼ inch drop" operation at the blank mold station of the machine head.

Referring to FIG. 1, one of a multiplicity of machine heads, designated generally at reference numeral 10, is mounted near the periphery of machine carriage 11 which is rotatable about the vertical axis of a stationary timing drum (not shown). Head 10 includes elements or mechanisms which are operated in proper sequence for finishing glass bottles. These mechanisms are identifiable as gob guide funnels 12, settle blow heads 13, blank molds 14 (shown open), double neck rings 15, plungers 16 insertable into the neck rings (FIG. 3), invert shaft 17, neck mold opening and closing mechanism 18 trunnioned on invert shaft 17, finishing mold 19 and its bottom plate 20, and final blow head 21.

Each head 10 is carried by rotation of carriage 11 beneath a flow type feeder (not shown) from which molten glass gobs are intermittently severed and guided into the open top of funnels 12 by mechanism of the type disclosed in U.S. Patent 2,836,934, J. E. McLaughlin et al., and owned by common assignee of this application. Upon delivery of the glass gob, the blank molds 14 are closed by air pressure actuation of blank cylinder piston 22 of the blank cylinder motor (FIG. 3) and interconnecting rack-pinion-rack-mechanism 23—24—25. Operation of the blank mold mechanism is described in detail in my copending application Serial No. 673,504 filed July 22, 1957. When the blank molds 14 are closed, plungers 16 are positioned to extend through their corresponding neck rings 15 by actuation of the twin fluid motor 31. The neck ring 15 is locked in closed position by downward actuation of piston 32 of fluid motor 33 which engages and locks neck mold clamps 32a over the free end of neck mold arms 34.

The guide funnels 12 are swung into aligned position over the open top of blank molds 14 by actuation of cylinder piston 26. Piston 26 is connected to rack 27 and in mesh with pinion 28.

After the gob is received in blank mold 14, the cylinder piston 26 is actuated to swing and align settle blow heads 13 over the open end of blank molds 14. The settle blow heads then lower on the funnels 12 to close the end opening to the blank mold for the settle blow operation. The settle blow heads 13 are lowered by actuation of cylinder piston 29 of hydraulic motor 30. Settle blow air is applied through blow heads 13 and funnels 12 to force the glass in the blank mold around the plunger 16 and fill the cavity of neck mold 15 for forming the bottle neck finish. Plungers 16 are then retracted by their motor 31 and funnels 12 are raised and swung to one side and baffle plates (not shown) are brought over the blank mold and seated. (The baffle plates are carried on the same carriage as frame 12a for the funnels.) Then counter-blow air is applied through the neck rings to form a cavity in the parison beginning at the neck opening thereof. Funnel and blow heads 12 and 13 are then raised and swung away from the blank molds 14. Blank molds 14 are opened by downward movement of cylinder piston 22 of the blank cylinder motor. The neck ring clamp 32a is released by actuation of piston 32 to permit the free end of the neck ring arms 34 to invert by rotation of invert shaft 17.

The formed partison is supported at its neck by neck ring 15. Invert shaft 17 is then rotated clockwise (FIG. 2) by reciprocable fluid motor 35 which is connected to rack gear 36 in mesh with pinion 37. Pinion 37 is keyed to the outer end of invert shaft 17. The invert operation is made to a point where the parison held in neck ring 15 is supported vertically between open halves of the finishing mold 19 (FIG. 1). Mold 19 is then closed, whereupon neck rings 15 are opened by sliding motion of each helf of neck mold arms 34 in counter directions by air motors internally of trunnions 18. A detailed explanation of this mechanism for opening and closing neck rings 15 is disclosed in my U.S. Patent 2,834,155. Thus, the bottle parison is deposited in finishing mold 19 and the neck ring arms 34 are reverted by counter clockwise rotation (FIG. 2) of invert shaft 17 ready for the next cycle (position shown on FIGS. 1 and 2).

Meanwhile, blow head 21 is swung into position and seated over the opening of the neck of the parison held in the finishing mold 19 (as shown on FIG. 1). Finally, blow air is introduced through the neck to blow the parison to final shape. The finished bottle is delivered from the machine by raising the blow head 21, swinging it out of the way, and opening the mold 19.

Having now described the operating characteristics for one head of the automatic glass blowing machine, reference will be had to FIG. 8, in conjunction with FIGS. 1–3, for a description of the air motors and circuits for automatically actuating the various glass forming machinery elements above described.

The above described operations of the various elements or mechanisms of each machine head 10 are effected by activating air motors connected to each machinery element. The air motors are activated at the proper time and in sequence by opening and closing air control valves or timing valves (referred to schematically and collectively at the left center portion of FIG. 8), which serve as timers to determine the time, during rotation of the machine carriage, at which each of the several air motors is operated. The timing valves are mounted on the rotating carriage 11 and operable by engagement with one or more cams on the stationary cylindrical drum located inwardly from the carriage. The control device for the timing valves is disclosed in my aforesaid U.S. Patent 2,860,524.

Each timing valve receives air under pressure through a line 38 from a source A, and when any one of the timing valves is actuated by a corresponding stationary cam, air under pressure is injected into a corresponding line to adjust a connected air motor to activate it to perform its intended function. These air motors, taken one by one, will now be described.

Prior to receiving a charge of glass, the neck rings 15 are in reverted position, closed and held under a spring operating internally within neck ring openings and closing mechanism 18 (FIG. 1). Operation of this mechanism is fully disclosed in my aforesaid U.S. Patent 2,834,155.

After the neck rings are closed and reverted, air is introduced in line 92 to shift the spool of spring loaded valve 93 and actuate the plungers 16 to their up or extended position. With valve 93 in this position, air from source A carried by lines 92 passes through valve 93, line 94a and into the underside of the cylinders housing pistons 31 (FIG. 3). The plungers 16 are held up until air in line 92 is turned off, whereupon the spring of valve 93 shifts its spool to connect the operating air in line 92 with line 94b. Line 94b extends to the upper side of the cylinders housing pistons 31 to force them down and retract the plungers 16.

After the plungers are "up," the blank molds will close by actuation of the corresponding timing valve to connect line 43 to the inlet side of valve 44. Valve 44, when opened, connects line 43 to line 45. Valve 44 normally blocks this connection by its spring loaded plunger 44a. Plunger 44a is depressed to open the valve by the down positioning of rod 47 whenever the neck mold 15 is in reverted position. When the valve 44 is thus opened, air flows from line 43 into line 45 and line 45a, the latter of which is T-connected to line 45 and enters valve 46. Valve 46 has a spring loaded spool normally blocking flow of air from source B in line 147 to the air motor 32 for lowering the neck clamp 32a (FIG. 3). This latter mentioned connection is to assure that the neck mold is closed and clamped before the blank mold is closed and receives glass and provides an added safety feature on the machine.

Air under pressure in line 45 is also used to shift the valve spool of valve 48, which controls the actuation of piston 22 of the blank cylinder for closing the blank molds 14. The blank molds are closed by connecting pressure source A carrying operating air in line 49 to port 50 of the cylinder piston 22 of the blank cylinder. Its piston 22 is thereby forced upwardly to close the blank molds, as previously described.

Next, the funnel and settle blow head arm 12a carrying funnels 12 and settle blow heads 13 is swung into aligning position so that funnels 12 are over the top of the blank molds 14. This is accomplished by the corresponding timing valve connecting air to line 51. Line 51 is connected to valve 52 of the air motor 26 for swinging the arm 12a. Operating air from source A carried in line 53 is connected by valve 52 to drive air motor 26. The funnels are then lowered. This is accomplished by connecting air to line 54 to shift valve spool 55a of valve 55 to admit operating air in line 53 into motor 30, thereby forcing its piston 29 downwardly. As seen in FIG. 3, operating air enters port 56 of motor 30. At the same time, the valve spool 55b is operated by air pressure supplied in line 60 and may be manipulated to connect opoperating source A to passage 57. The lower piston 29a, having a greater surface area than piston 29, is held upwardly and in abutting relationship with piston 29.

At this time, the blank molds, having funnels 12 aligned with their openings and raised slightly therefrom, are ready to receive the charge of molten glass. The settle blow heads 13 are angularly displaced sufficiently to permit entrance of a gob glass into the funnel 12.

At the proper time, when blank molds 14 are in their correct spacial relationship with the feeder, two gobs of glass are fed simultaneously to the funnels 12 by apparatus described in the commonly owned copending application Serial No. 550,028, filed November 30, 1955, now U.S. Patent No. 2,913,852.

After the glass charge is deposited in the blank mold 14, air is connected to line 58 and valve spool 55c is shifted to connect operating air to the settle blow head swing motor 59 which pivots arm 13a carrying the settle blow heads 13 in a horizontal plane until they are aligned over the funnels 12.

The ¼" settle drop is next accomplished by actuation of a timing valve to introduce air into line 53 connected to valve spool 55a of valve bank 55. Valve bank 55 controls the operation of motor 30 (FIG. 3) so that the upper spool 55a controls operating air for raising and lowering piston 29 for raising and lowering the funnel, baffle and settle blow heads. Spool 55b controls operating air to apply pressure to underside of lower piston 29a. When piston 29 is actuated to lower, it lowers until it abuts piston 29a. Due to 29a having a greater area than piston 29, and spool 55b connecting air to the underside of the latter, piston 29a is a stop, and the piston 29 ceases to lower. By controlling spool 55b to shut off operating air to the lower side of piston 29a, the force on piston 29, then being greater, lowers the settle blow heads a short distance relative to the funnels, such as ¼", to seat them over the open top of funnels 12.

The settle blow operation is then performed in the manner well-known in the glass container forming art to assure proper formation of the neck finish in neck rings 15. This settle blow air is introduced in the settle blow heads 13 by connecting air to line 62 which shifts the valve spool of valve 63 to open it. When valve 63 is thus opened, operating air from source B carried in line 64 is admitted through channels in arm 13a and connected into the settle blow heads 13.

After the settle blow operation, air is taken off line 60 to permit valve spool 55b of 55 to again connect operating air in channel 57 and raise arm 12a ¼" to free the settle blow heads from the top of the funnels, and, approximately at the same time, air is taken off line 54 to permit valve spool 55a to transfer air to the underside of piston 29, which will lift frame 12a carrying the funnels up out of the blank seats. The funnel arm 12a is then swung out of the way and a counter blow baffle (not shown) is swung over the opening of the blank molds and then lowered to seat thereon.

About this time, air is introduced into line 65 to actuate the spring loaded valve spool of valve 66. This connects operating air from source B in line 67 to line 68a connected to the cylinder operating the neck guide rings 16a to upwardly extend them to their up position.

Air is then introduced into line 68 connected to actuate the spool of counter blow valve 69. This connects operating air from source B through valve 69 to the counter blow air chamber 70 communicating with the internal opening in the guide rings 16a about plungers 16. The counter blow air is thus applied to the parison through its neck mold to blow the glass upwardly therein against the counter blow baffles. The counter blow is a well-known expedient utilized in blow and blow machines for forming glass containers.

After the counter blow operation is performed, the counter blow baffle is raised and swung out of the way by mechanical means. The blank molds 14 are then opened by a timing valve turning air off in line 43. The spring loaded spool of valve 46 shuts off the air holding the neck mold clamp down and locked and permits it to raise. The spring loaded spool of valve 48 shifts the air connection to the blank cylinder to force its piston 22 downwardly and open the blank mold 14. With the thus formed parisons held by the neck rings 15 of the neck mold, they are now ready for invert by rotation of invert shaft 17. This is accomplished by connecting air to line 71 for actuating the spool of valve 72 to connect operating air from source A through line 73 to operate fluid motor 35 (FIG. 2). A blank slide valve 71a is positioned along the travel of the blank slide of the blank mold mechanism (FIG. 3) and is spring loaded to normally block line 71. When the blank molds are fully open, the valve is depressed to open line 71 and permit air to operate the invert valve 72. This blank slide valve 71a in line 71 serves to prevent invert of the neck molds if the blank molds are not fully open. When valve 72 is actuated, motor 35 shifts rack gear 36 to impart clockwise rotation to gear 37 and invert shaft 17 through approximately 180° rotation. After invert, the parisons are held in suspended vertical position supported at their neck rings 15 and are aligned along the parting line for the finishing mold 19 (FIG. 1). Finishing mold 19 is closed by cam operated mechanical means (not shown).

After the molds 19 are closed, air is introduced into line 74 which is connected to valve 39 for controlling the opening of neck mold arms 34. As previously stated, neck arms 34 are normally held closed by coil springs within the trunnion mechanism 18. Air operated cylinders 42 in each trunnion mechanism 18 (shown schematically on FIG. 8) are actuated to overcome these coil springs and open the neck rings 15 in the usual manner to release the neck finish of each parison and deliver the parisons to the blow mold 19. To accomplish this, air in line 74 shifts spool 75 of valve 39 to connect operating air from source A, carried in line 40, to line 41 for operation of the air cylinders 42. Thereafter, air is taken off line 71 and the spring loaded valve 72 shifts the connection of the operating air on motor 35 (FIG. 2) to shift the rack 36 in the direction for reverting the neck mold arms 34 to the position shown on FIGS. 1 and 2.

While the neck mold is being reverted, air is introduced in lines 76 connected to shift the spool of valve 77. Interposed in line 76 is a spring loaded poppet valve 78 normally maintaining line 76 open. However, if the plunger 79 of valve 78 is depressed, the flow of air in line 76 to valve 77 is blocked. Plunger 79 is accordingly depressed by cam 80 riding on eccentrically positioned pin 81 at the outer end of invert shaft 17 whenever shaft 17 is rotated towards the neck mold's inverted position (FIG. 2). Hence, after the neck mold is reverted, valve 78 is permitted to open and air passes to valve 77 to shift its spring loaded spool and connect operating air from source A in line 82 to the air motor 83 to drive it for lowering and swinging blow head 21 over the top of blow mold 19 in any well-known manner. The lowering motion may be achieved by downward movement of the piston in motor 83. The swinging may be achieved by having a cam follower affixed to the piston rod and riding in a vertically disposed helical cam groove (not shown). Air is next introduced into line 84 to shift the spring loaded spool of valve 85 to connect lines 86 and 87. Line 86 is T-connected to line 67 carrying operating air from source B. Line 87 is connected to a blow air regulator 21a (FIG. 2), which is designed to regulate the pressure of the blow air in the well-known manner. Line 88 carries the blow air from regulator 21a into blow heads 21, whereupon this blow air enters the neck finish of the parison and blows it out to the finished shape of a bottle.

Vacuum from a source C is connected by a line 89 in bottom plate 20 of the finishing mold and is turned on and off by valve 90. Prior to opening the finishing mold 19, air is introduced into line 91 which shifts the spring loaded spool of valve 90 to open it and draw a vacuum through the bottom plate 20. The vacuum is applied for stabilizing the container to permit stripping it from the finishing mold when the latter is opened. The finishing mold 19 is then opened by mechanical means and the air in line 91 turned off to shut off the vacuum through the bottom plate. The finished container is then removed from the bottom plate by a take-out mechanism (not shown).

As shown on FIGS. 1, 8, and 9–12, certain air lines from the cam operated timing valves, namely, lines numbered 74, 43, 54, 92, 65, 71, 76, 60, and 51 (reading left to right on FIGS. 8–12), are connected through a bank of hand operated valves 95. These valves 95 are adjusted manually by turning knobs, such as indicated schematically at 95a (FIG. 8). All the valves in bank 95 are normally set to connect the aforementioned air lines from the timing valve to their counterparts on the other side of the valve 95 for permitting automatic operation of the machine head. The valve bank 95 also receives operating air from source A through connection by line 53, and this air is accessible at each of the outgoing air line connections in the valve bank. By turning any of the knobs 95a of the valve 95 will set that segment of the valve to disconnect the corresponding incoming air line from the timing valve and its outgoing counterpart, and at the same time, connect the outgoing air line to the air in line 53. The purpose of the valve bank 95 is to provide a means of individually and manually controlling the operation of certain of the air motors for actuating certain of the glass forming elements of the machine head such as when the entire machine is stopped. For example, if, after the machine has stopped, it is desired to open the neck molds, this may be accomplished by turning the knob 95a corresponding to air line 74 so as to connect the outgoing air line 74 at valve 95 with operating air from line 53. This connection will shift the spool of valve 66 (FIG. 8) and connect lines 67 and 68a to actuate the neck molds to open, in the manner previously described. Other forming elements may be operated similarly by manual operation of the corresponding knobs 95a.

Having described the automatic operation for one head of the rotary glass machine, the novel selective control concept of the invention will now be described as it applies to one of the machine heads.

This control feature broadly considered, amounts to connecting through a control valve certain of the key air lines that lead to air motors for automatically effecting their operation sequentially at the proper time, in the previously described manner. With this control valve connected into these selected key air lines corresponding to key operations of the process, the automatic operation may be interrupted, at will, by making a single setting of this control valve to effectively inactivate the entire machine head operation without affecting the glass forming operation of the remaining heads of the machine. As will be seen presently from the description of FIGS. 9–12, the effect of the control valve on each of these key operations of the automatic process will be considered individually.

Turning now to FIGS. 4–7, the structure of the aforementioned control valve, designated generally at reference numeral 96, will be described. The control valve 96 comprises a main body portion 97 provided with a cover plate 98 held in place by cap screws 99. Opposite the cover plate 98 a base plate 100 is assembled by cap screws 101, and provides a mounting support for the valve 96 on the frame 11 of the machine head 10. The main body 97 is provided with an axially bored central passage 102 which communicates at one end with an inlet port 102a in cover plate 98, and terminates adjacent base plate 100 at its other end. At approximately 90° radial spacings about central passage 102 in the main body 97 is provided four vertically bored valve chambers 104 extending the length of the main body 97 (FIG. 5). These valve chambers 104 are each vented through cover plate 98 at openings 105. One valve chamber 104 and a cooperating valve spool 109 is provided for each element of the forming machine head that it is desired to be controlled by the control valve 96. At the side of main body 97 and along each valve chamber 104 is an individual bank of ports. Each bank of ports includes an exhaust port 106, an outlet port 107, and an inlet port 108, each of which communicates with their corresponding valve chamber 104. Internally of each valve chamber 104 is an axially shiftable valve spool 109. Each spool 109 has end lands for defining therebetween an annular air passage 110 adapted to alternatively connect outlet ports 107 and inlet ports 108 when the spools 109 are in their "down" position (as shown on FIG. 4), and outlet ports 107 and exhaust ports 106 when the spools 109 are shifted to their "up" position (not shown). At the end of the main body 97 adjacent the base plate 96 is provided a radial passage 111 connecting the central bore 102 with the corresponding end of each valve chamber 104. Thus, when air under pressure is introduced through inlet port 102a into central bore 102, passage 111 transmits the air to the underside of each valve spool 109 to shift it upwardly and connect each of the outlet ports 107 and their corresponding exhaust ports 106. The inlet port 108 is thereupon blocked. When the air is shut off at inlet port 102a, valve spool 109 is returned to the position shown in FIG. 4, by a coil spring 112. A leakage vent 115 is provided in each valve chamber 104 to exhaust any air that might leak past valve spool 109 along the walls of the valve chambers 104.

The air connection to inlet port 102a is made by conduit 113 extending to any source of air pressure (not shown) sufficient to compress spring 112 and shift the valve spool 109 to its upper position. Interposed in line 113 is a hand-operated valve 114 shown schematically in FIGS. 9–12. Valve 114 is a conventional valve having alternative settings for either opening or closing conduit 113. The hand-operated valve 114 is shown on FIG. 1 bolted to the motor housing 83. This location for the valve 114 has been selected because it is an outermost location at the periphery of each head 10 of the machine providing easy access for hand-operation of it while the glass machine is rotating.

At the one valve chamber 104 corresponding to the "plunger up" connection through valve 96, to be presently described in connection with FIG. 12, is a radial passage 120 connecting the central passage 102 and this valve chamber 104 at a point opposite its exhaust port 106. This passage 120 is located such that when the valve spool 109 is in its up position, its passage 110 will form a connection through passage 120 between central passage 102 and outlet port 107 of that valve chamber. This construction will become evident from the description hereinafter of FIG. 12.

Referring now to FIGS. 9–12, the control valve 96 is shown connected into the hydraulic circuit of FIG. 8 for controlling the various air motors operating certain selected key elements of the glass forming machinery. When the control valve 96 is set in the position shown in FIG. 4 by shutting off air in line 113 by the hand-operated valve 114, the timing valves control the various elements of the glass forming machinery which then operate automatically to perform the glass forming cycle previously described in detail under FIG. 8. However, when the hand-operated valve 114 is opened to introduce air into control valve 96 at line 113, each valve spool 109 is shifted upwardly and the timing valves that are connected through the control valve 96 are effectively removed from automatic operation by blocking the air that is introduced from their corresponding timing valves and venting the outgoing control line to the atmosphere. Alternatively, the valve 96 could be so constructed to permit automatic operation of these machinery elements when air is turned on by valve 114, etc. The latter approach would, however, be the least practical of the two.

More specifically, these connections for each of the key glass forming elements for the machine head are depicted separately on FIGS. 9–12. It should be apparent from description of these figures in conjunction with the description for FIG. 8, previously set forth herein, how the control valve 96 may effectively stop operation of the essential glass forming elements for a particular head of the machine.

In FIG. 9, the ¼″ settle drop operation is performed by the timing valve opening air into air line 60, as previously described. Air line 60 is connected into the valve 96 at one bank of ports entering at the air inlet port 108 and leaving it through the corresponding outlet port 107. When the valve spool 109 is in the down or "on" position (FIG. 4), the air connection is completed in the air line 60 through valve 96 to shift the valve spool 55b of the valve 55 to perform the ¼″ settle drop operation in automatic operational sequence. When the hand-operated valve 114 is set to turn the air on in conduit 113, the valve spool 109 is shifted to its up or "off" position to break the connection in air line 60 by blocking inlet port 108. The ¼″ settle drop operation is thereby prevented from operation in the automatic sequence of operation for that machine head 10.

Figure 10:
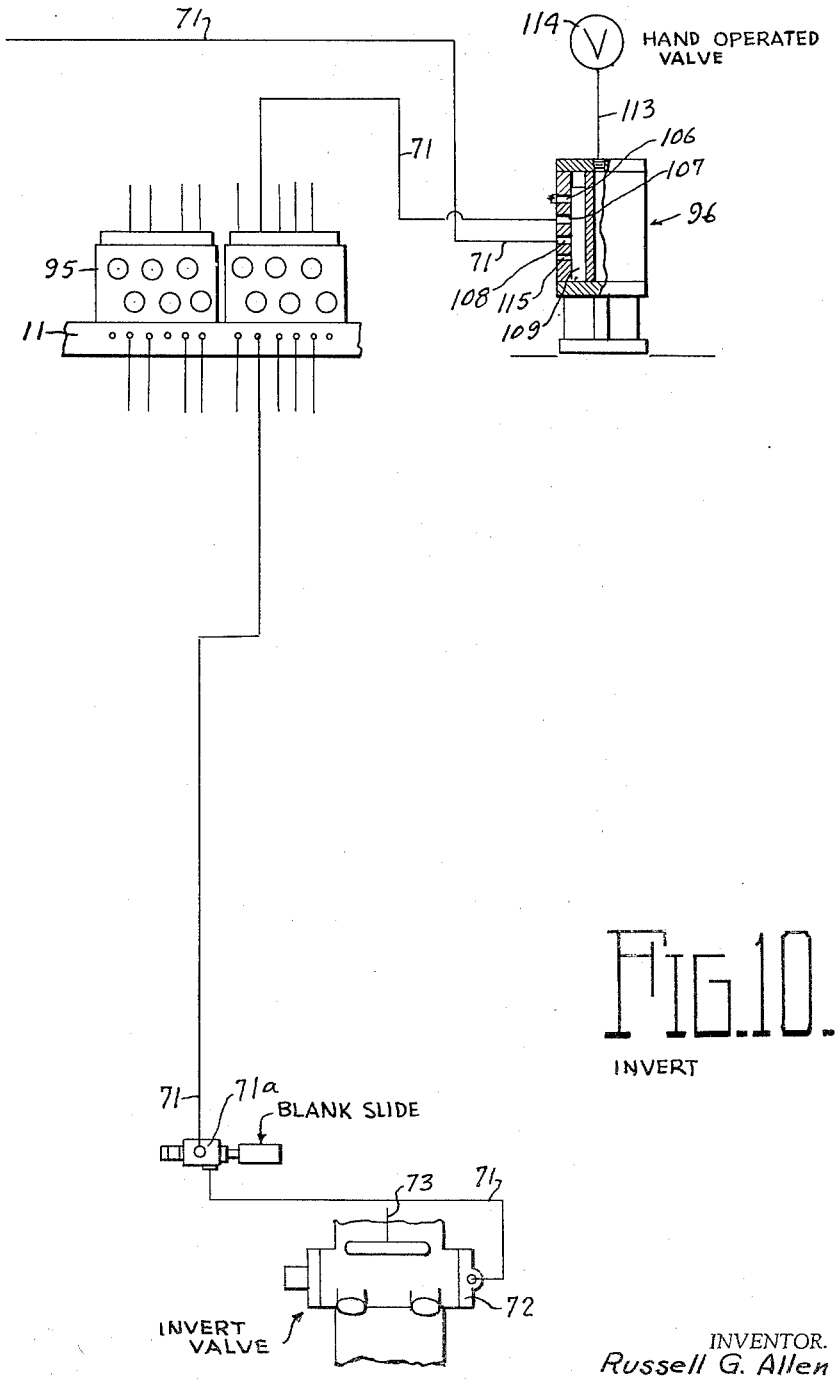
FIG. 10 is a partial schematic view showing the control valve of the invention connected into the automatic control system of FIG. 8 for regulating "invert" of the machine head.

Similarly, in FIG. 10 the air line 71 is connected into the bank of ports of a different valve chamber 104 of the control valve 96 entering at inlet port 108 and leaving at the corresponding outlet port 107. Valve spool 109 normally is set to complete the connection of line 71 to the invert valve 72 when it is in the down position. When hand-operated valve 114 is thrown to shift the valve spool 109, the air connection in line 71 is blocked to prevent automatic operation of invert of the neck mold.

Figure 11:
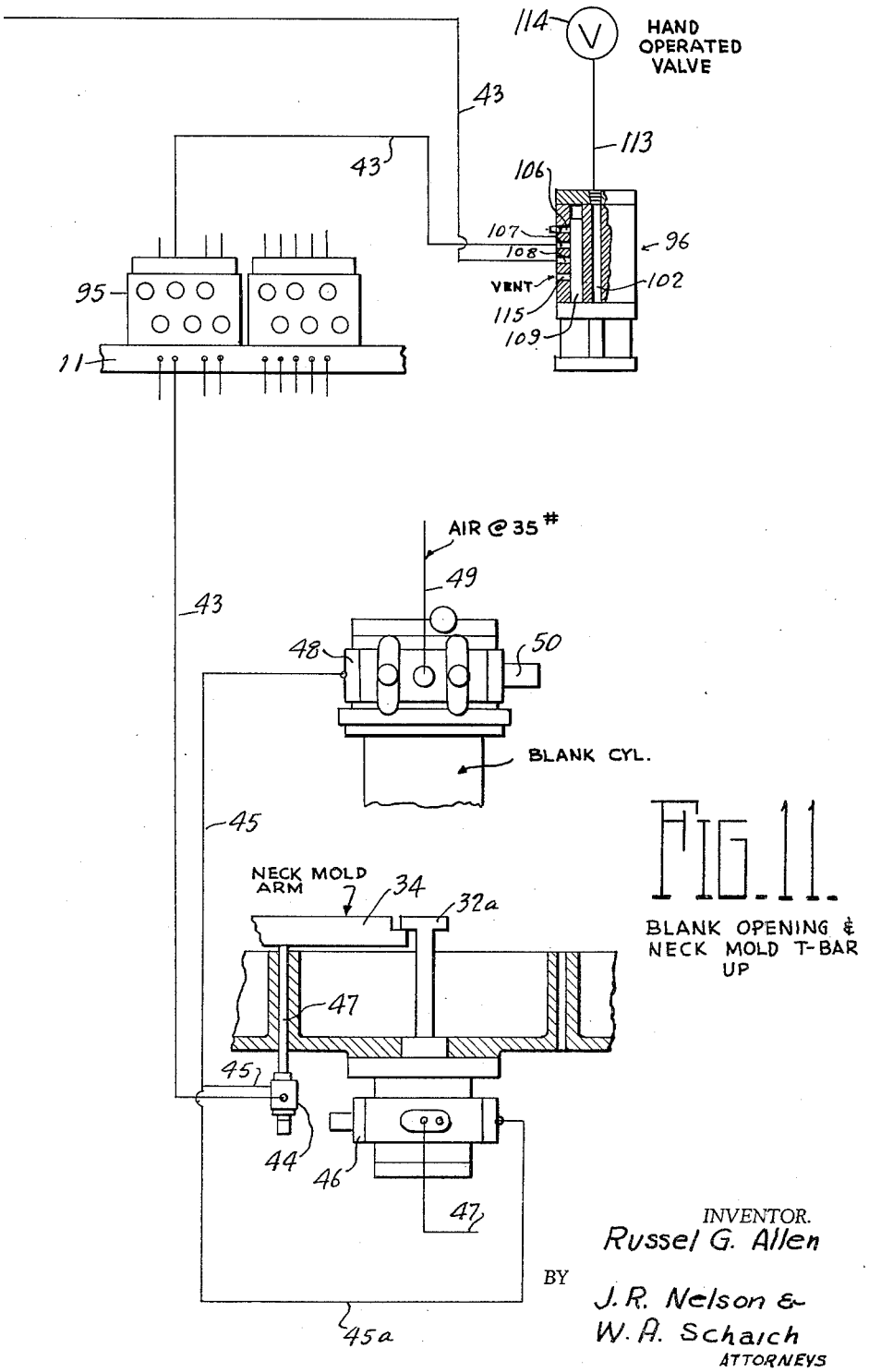
FIG. 11 is a partial schematic view showing the control valve of the invention connected into the automatic control system of FIG. 8 for regulating "blank mold" and "neck mold" opening mechanism.

In FIG. 11 the air line 43 from the timing valve is connected into a separate valve chamber 104 of the valve 96 at its bank of ports entering at air inlet port 108 and leaving by connection to the corresponding outlet port 107. When the hand-operated valve 114 is turned "on," the valve spool 109 blocks the inlet port 108, as before. Thusly, the blank cylinder is prevented from closing and the neck mold clamp 32a is prevented from operating.

In FIG. 12, the air line 92 from the timing valve is connected through the bank of ports of a separate valve chamber 104 of control valve 96 entering at inlet port 108 and exiting at the corresponding outlet port 107. When the hand-operated valve 114 is turned "on," the valve spool 109 blocks the inlet port 108, as before. The spring loaded valve 93 is set to normally connect operating air in line 82 to line 94b at the upper side of the plunger pistons and force the plungers down. It is desired, however, that the plungers be in the "up" position for changing them on the fly; hence, when valve spool 109 of valve 96 is shifted upwardly the line 92 is blocked and passage 110 along spool 109 connects a radial passage 120 in this bank of ports to outlet port 107 and line 92 (see FIG. 4). Exhaust port 106 is provided with a plug 106a at this bank of ports to permit air under pressure to flow into line 92. Thus, the air introduced through line 113, after shifting valve spool 109 to its upper position, passes through passage 110, outlet port 107, and line 92 to shift the spool of valve 93. In so doing, the operating air in line 82 connected to line 94a to the underside of the plunger cylinder to force the plungers 16 to their extended or "up" position.

The control valve 96 is shown as a multiple block valve with four valve chambers with banks of ports and valve spools for each. As mentioned, each valve block operates in the same manner, with the exception of the latter that is described in connection with FIG. 12, wherein the exhaust port 106 of that bank is blocked (plugged) by plug 106a and a radial passage 120 (as seen on FIG. 5) is connected between the central bore 102 of the valve 96 and that axial passage way 110 of the valve spool.

It should be understood that the control valve 96 may be constructed with more or less valve chambers and/or banks of ports radially arranged about the central passage 102 to provide control for other operating elements of the machine head in a similar fashion.

Having therefore described one operating embodiment of the invention, it will, of course, be understood that various details of construction may be modified through a wide range without departing from the principles of this invention, and it is not the purpose to limit the patent granted hereon otherwise than necessitated by the scope of the appended claims.

I claim:

1. In a control device for automatic glass forming machinery, the latter having a multiplicity of operating heads, said control having a central timing drum influencing a plurality of timing valves on each said machine head to successively actuate in an automatically controlled and planned sequence the operating machinery elements of each said head for performing glass forming operations, the timing valves for each head being interposed in fluid connections extending between a fluid pressure source and a corresponding fluid motor control for a fluid motor connected to operate individual machinery elements on that machine head, the improvement in said control for selectively removing a machine head individually from automatic sequence to retain the operating machinery elements thereof in an inactive status, said improvement comprising a pilot operated valve for each machine head, said valve including a body, a plurality of valve chambers in said body, each chamber including inlet and outlet ports, said valve being interposed in said fluid connections and between the timing valves and the motor controls, each said fluid connection entering a valve chamber at its inlet port and exiting at its corresponding outlet port, a valve spool in each valve chamber, means operatively connected with each valve spool for normally setting it to connect the said inlet and outlet ports of its valve chamber and shiftable alternatively to disconnect the inlet and outlet ports of its valve chamber and break the said fluid connection therethrough, and means operatively connected to the valve spools and operable, at will, for collectively shifting said spools and disconnecting each said fluid connection through their respective valve chamber, whereby the machinery elements of that machine head are rendered inactive.

2. In a control device for rotary glass forming machines having a multiplicity of operating heads, each capable of operating through a glass forming cycle for producing articles of glassware, each said head being controlled to perform successive forming cycles by a central stationary timing drum influencing a plurality of timing valves of each of the operating heads and in proper sequence, and said timing valves for each machine head being connected to fluid actuated control means of fluid operated motors for actuating the operating machinery elements of each said head to perform its said forming cycle automatically by having fluid connections between each timing valve and a corresponding control means for a machinery element, the improvement for selectively interrupting the operating sequence of the heads of the machine individually without interrupting the sequence of operations of the entire multi-head machine, said improvement comprising a multiple block valve having a plurality of valve chambers, each said chamber having spaced-apart inlet and outlet ports, a fluid connection connected to each valve chamber at its said inlet and outlet ports and connected with one of said plural fluid connections for each machine head, means in said valve chambers normally set to connect the said inlet and outlet ports thereof and shiftable alternatively to disconnect said ports thereof and block said plural fluid connections collectively, said means comprising a valve spool shiftably mounted in each of said valve chambers for movement between alternative settings to connect and disconnect its said inlet and outlet ports, and a spring compressed within each said chamber and against one end of its valve spool for normally holding the valve spool in setting to connect said inlet and outlet ports thereof, and means operatively connected to said last-mentioned means for shifting the valve spools thereof collectively to disconnect all inlet ports from their respective outlet ports, whereby to effectively close off all of said plural fluid connections of said machine head.

3. The combination defined in claim 2, wherein the means operatively connected to disconnect the said inlet and outlet ports comprises a source of air under pressure, a fluid conducting means from said source to the end of each valve chamber opposite the spring loaded end of the valve spool to shift each said spool and disconnect the said inlet and outlet ports, and a hand operated valve interposed in said fluid conducting means adapted, at will, to alternatively connect and disconnect said source and each said valve chamber.

4. In a fluid actuating automatic timing control system for each machine head of a multiple head rotary glass forming machine, having a timing valve connected in a fluid circuit for influencing actuation of each of the several glass forming machinery elements thereof, the improvement comprising a multiple block control valve comprising a body, a plurality of axial valve chambers in said body, inlet and outlet ports communicating with each of said chambers and spaced apart therein, fluid conduit connections between the timing valve and the several machinery elements of the forming machine being controlled by the timing valve, each said fluid conduit connection being in circuit with an inlet and corresponding outlet port of said control valve, a shiftable valve means in each of said chambers set to normally connect the inlet and outlet ports thereof, and manually-controlled valve operating means connected to simultaneously shift said shiftable valve means and disconnect each said inlet port from its corresponding outlet port, thereby collectively removing the effect of the timing valves connected through said control valve.

5. The combination defined in claim 4, wherein the shiftable valve means comprises a valve spool in each of the axial valve chambers and is spring set to normally connect the inlet and outlet ports thereof, fluid conduit means connecting pilot fluid pressure to the end of each of the valve chambers adapted to shift each of the valve spools against their springs and in a direction for disconnecting their said inlet and outlet ports, and said manually controlled valve operating means comprises a hand-operated valve interposed in said fluid conduit means, said valve having alternative settings for connecting and disconnecting the pilot pressure to said valve chambers.

6. In a fluid actuated automatic timing control system for each machine head of a multiple head rotary glass forming machine, having a timing valve connected in a fluid circuit for influencing actuation of each of the several glass forming machinery elements thereof, said machinery elements being operated by valve controlled fluid motors, and the machinery elements including a blank mold opening and closing mechanism, a neck mold invert mechanism, reciprocable plunger mechanism shiftable between extended and retracted positions, and funnel and settle blow head lowering mechanism, the improvement comprising a multiple block control valve comprising a body, a central passage terminating in said body, four separate valve chambers in said body and radially spaced from said central passage, a fluid connection from corresponding timing valves to their respective said fluid motors for controlling actuation of the said blank mold, invert, plunger, and funnel and settle blow head mechanisms, each said fluid connection being individual through inlet and outlet ports of a different valve chamber, a spring loaded valve spool in each of said chambers normally connecting the inlet and outlet ports thereof, and adapted to shift axially in said chambers to disconnect their said ports, a radial passage connecting one end of each said chambers opposite the spring loaded end of the valve spool therein to the said central passage, a source of pressure fluid, a conduit means connected between said central passage and said source for shifting said spools collectively by fluid pressure thereby disconnecting said inlet and outlet ports, a hand-operated valve interposed in said conduit means and having alternative settings for, at will, connecting and disconnecting said source and said central passage, said hand-operated valve, when set to connect said source and central passage, adapted to actuate the valve spools collectively to remove the effect of the timing valves connected through said control valve and thereby effectively removing the said four mechanisms from automatic control.

7. The combination defined in claim 6, wherein said one of the valve chambers provided with said fluid connection from the timing valve to the fluid motor for controlling actuation of the plunger mechanism is further characterized by having a radial fluid passage communicating between the said central passage of the control valve and the said one valve chamber, said radial fluid passage being connected to the outlet port of said one chamber by its associated valve spool whenever the hand-operated valve is set to connect the fluid source and said central passage, whereby fluid from the source will control the reciprocable plunger mechanism to maintain its plunger in its extending position.

References Cited in the file of this patent

UNITED STATES PATENTS

| | | |
|---|---|---|
| 2,013,463 | Headley et al. | Sept. 3, 1935 |
| 2,047,507 | Howard | July 14, 1936 |
| 2,267,236 | Goodrich | Dec. 23, 1941 |
| 2,642,087 | Chistensen | June 16, 1953 |
| 2,702,444 | Rowe | Feb. 22, 1955 |
| 2,705,020 | Frantz | Mar. 29, 1955 |
| 2,803,266 | Towler et al. | Aug. 20, 1957 |
| 2,811,814 | Winder | Nov. 5, 1957 |
| 2,823,647 | Meyer | Feb. 18, 1958 |
| 2,838,059 | Biagi et al. | June 10, 1958 |